(12) United States Patent
Takayasu et al.

(10) Patent No.: US 8,668,263 B2
(45) Date of Patent: Mar. 11, 2014

(54) VEHICLE SEAT

(75) Inventors: Wataru Takayasu, Tochigi-ken (JP); Kenichi Niitsuma, Tochigi-ken (JP)

(73) Assignee: TS Tech Co., Ltd., Asaka-Shi, Saitama-Ken (JP)

( * ) Notice: Subject to any disclaimer, the term of this patent is extended or adjusted under 35 U.S.C. 154(b) by 1210 days.

(21) Appl. No.: 11/816,212

(22) PCT Filed: Feb. 14, 2006

(86) PCT No.: PCT/JP2006/302564
§ 371 (c)(1),
(2), (4) Date: Apr. 22, 2011

(87) PCT Pub. No.: WO2006/085658
PCT Pub. Date: Aug. 17, 2006

(65) Prior Publication Data
US 2011/0187167 A1 Aug. 4, 2011

(30) Foreign Application Priority Data

Feb. 14, 2005 (JP) ................................. 2005-036290

(51) Int. Cl.
*B60N 2/427* (2006.01)
*B60R 21/013* (2006.01)

(52) U.S. Cl.
USPC ................................. 297/216.12; 297/216.14

(58) Field of Classification Search
USPC ....................................... 297/216.14, 216.12
See application file for complete search history.

(56) References Cited

U.S. PATENT DOCUMENTS

| 5,795,019 A | 8/1998 | Wieclawski |
| 6,749,256 B1 * | 6/2004 | Klier et al. ................ 297/216.12 |
| 6,779,840 B1 * | 8/2004 | Farquhar et al. ......... 297/216.12 |
| 6,789,846 B2 * | 9/2004 | Humer et al. ............ 297/216.12 |
| 7,104,602 B2 * | 9/2006 | Humer et al. ............ 297/216.12 |
| 7,188,894 B2 * | 3/2007 | Humer et al. ............ 297/216.13 |

FOREIGN PATENT DOCUMENTS

| JP | H10-119619 A | 5/1998 |
| JP | 2001-37577 A | 2/2001 |
| JP | 20031-27741 A | 5/2003 |
| JP | 2003-267107 A | 9/2003 |

OTHER PUBLICATIONS

International Search Report for International Application No. PCT/JP2006/302564 dated May 16, 2006.

* cited by examiner

*Primary Examiner* — Milton Nelson, Jr.
(74) *Attorney, Agent, or Firm* — Browdy and Neimark, PLLC

(57) ABSTRACT

The vehicle seat includes a collision sensor provided to a seat back frame and being movable relatively backward by a rear-end collision, a headrest attached to the seat back frame and being movable between a normal support position and a head protection position anterior to the normal support position. The headrest is movable from the normal support position to the head protection position when the collision sensor is moved backward. The vehicle seat has a lock mechanism attached to the seat back frame. The lock mechanism is moved to a lock position by inertia when receiving an external force by a rear-end collision to regulate a return of the headrest from the head protection position to the normal support position.

6 Claims, 8 Drawing Sheets

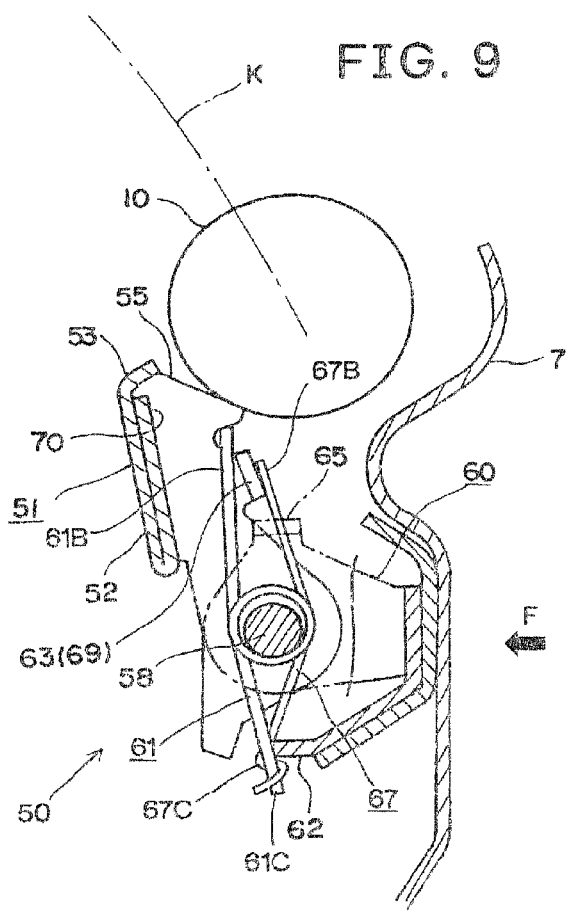
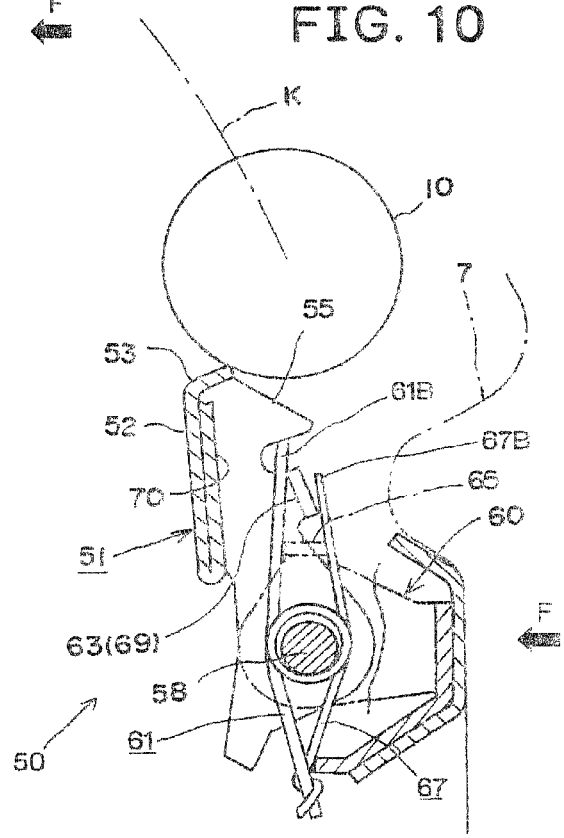

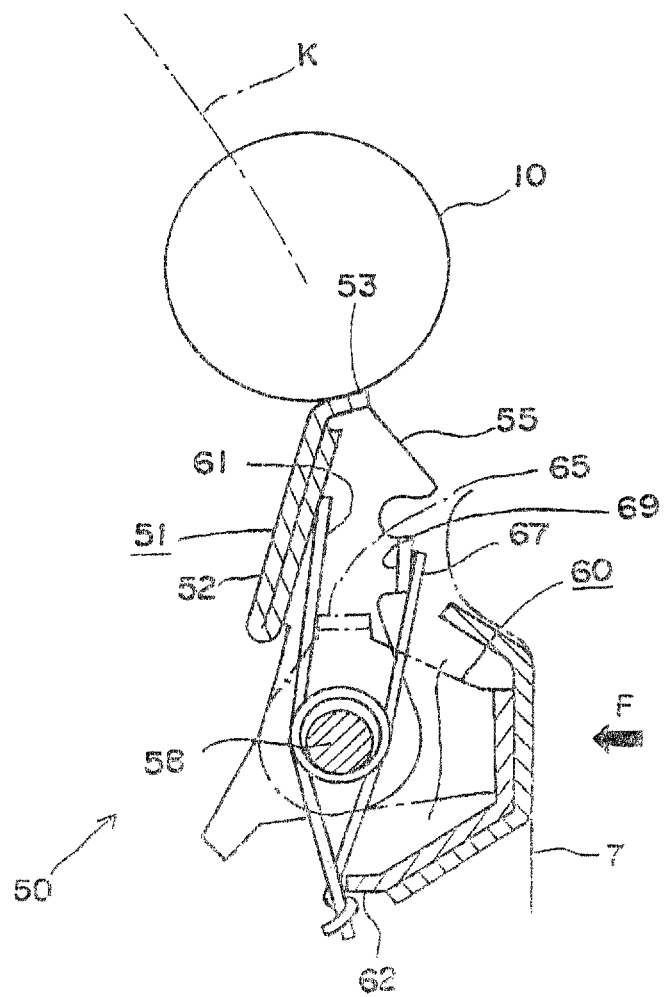

VEHICLE SEAT

TECHNICAL FIELD

The present invention relates to a vehicle seat, and more particularly to a vehicle seat including a headrest moving from a normal support position to a head protection position at the time of a rear-end collision.

BACKGROUND ART

Conventionally, there is a well-known vehicle seat including a seat back frame, a collision sensor which is provided to the seat back frame and moves backward when a seat occupant is moved relatively backward to the seat back frame due to a rear-end collision, and a headrest which is attached to the seat back frame and is movable between a normal support position and a head protection position anterior to the normal support position, and which moves from the normal support position to the head protection position when the collision sensor is moved backward.
[Patent Document 1] Japanese Patent Application Laid-Open No, 10-119619

DISCLOSURE OF THE INVENTION

In the prior art, the headrest is moved to the head protection position when the collision sensor is moved backward. However, when the collision sensor returns anteriorly, the headrest moved to the head protection position returns to the normal support position.

Therefore, an object of the present invention is to provide a vehicle seat having a lock mechanism capable of holding the headrest moved to the head protection position at the head protection position, without imposing unnecessary resistance to the movement of the headrest to the head protection position caused by the backward movement of the collision sensor.

In accordance with the present invention, the headrest moved to the head protection position by a rear-end collision can be exactly held at the head protection position, which improves the performance for protecting a head by the headrest.

Further, in accordance with the present invention, even when the headrest moves toward the head protection position by an external force other than a rear-end collision, the headrest is not locked at the head protection position. Therefore, the headrest is prevented from being locked by mistake.

BRIEF DESCRIPTION OF THE DRAWINGS

FIG. 9 is a sectional view showing the lock mechanism and a headrest supporter in a normal state taken along the line 9-9 in FIG. 3;
FIG. 10 is a sectional view when a locking member of the lock mechanism is at an initial position taken along the line 9-9 in FIG. 3;
and
FIG. 11 is a sectional view when the locking member of the lock mechanism is at a lock position taken along the line 9-9 in FIG. 3.

BEST MODE FOR CARRYING OUT THE INVENTION

Figure 1:
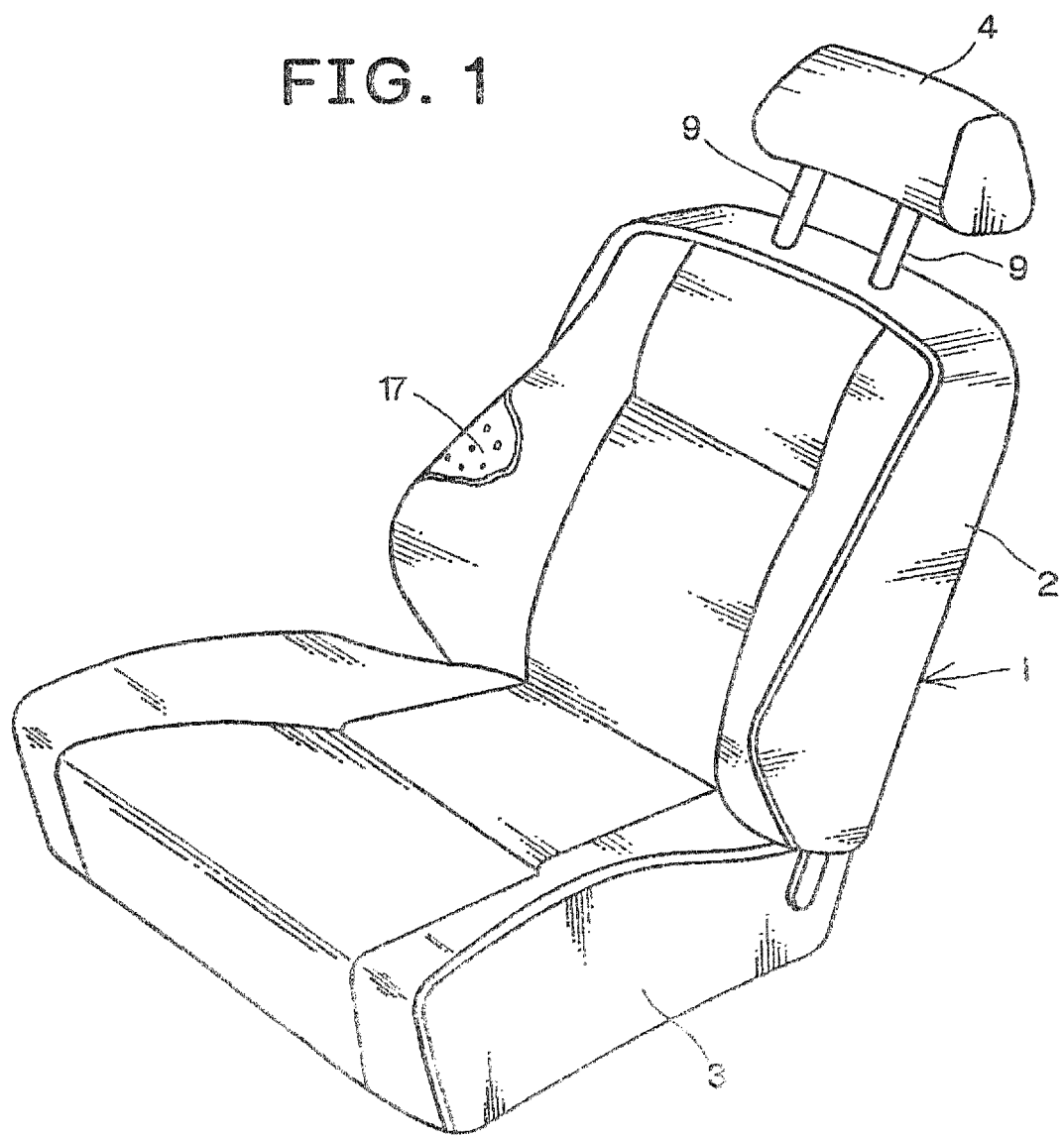
FIG. 1 is a perspective view of a vehicle seat.
Figure 2:
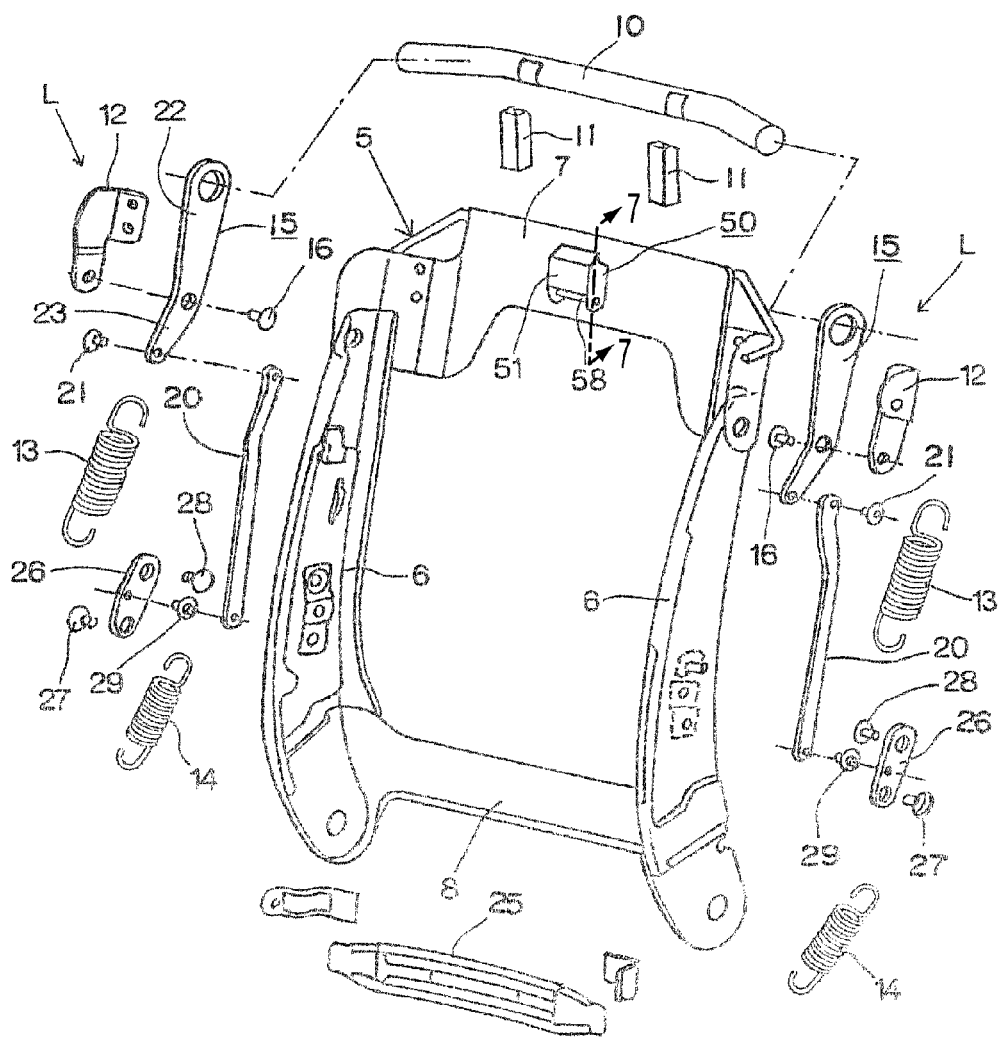
FIG. 2 is an exploded perspective view of a seat back frame and a transmission mechanism in the vehicle seat.
Figure 3:
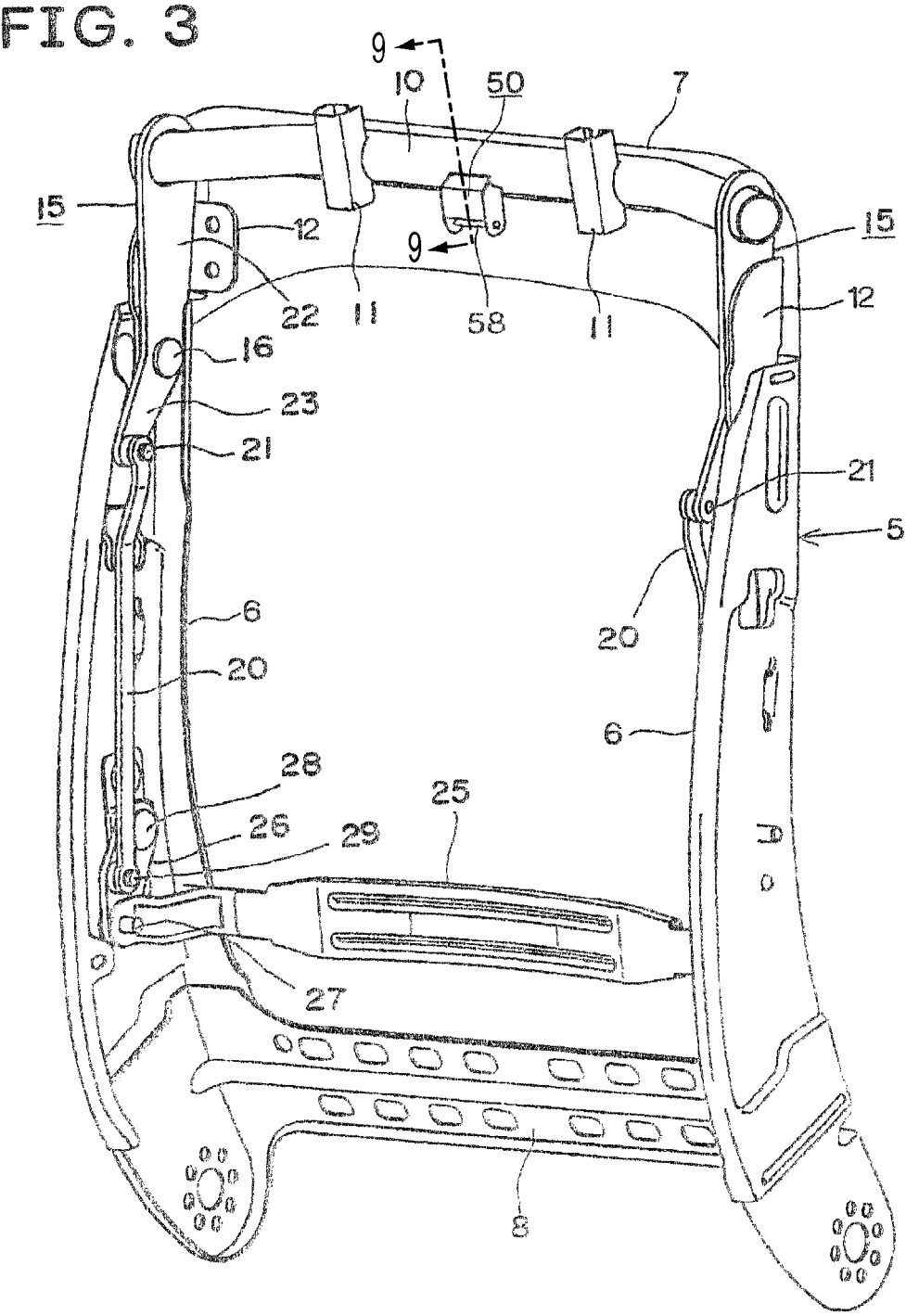
FIG. 3 is a perspective view showing an assembled state of the components in FIG. 2.

To describe an embodiment of the present invention, a vehicle seat 1 of the present invention has a seat back 2, a seat bottom 3, and a movable headrest 4 provided to an upper portion of the seat back 2. The headrest 4 is movable substantially forward from a normal support position toward an anterior head protection position by a collision load due to a vehicle rear-end collision. A seat back frame 5 of the seat back 2 has a pair of side frames 6, an upper frame 7, and a lower frame 8, forming a framed rectangle.

A headrest supporter 10 movable to extend transversely with respect to the seat back frame 5 is installed in the vicinity of the upper frame 7. Vertical engagement parts 11 into which the lower portions of pillars 9 of the headrest 4 are inserted are fixed to the supporter 10. The pillar 9 is supported to be freely adjusted in height by the vertical engagement parts 11.

Brackets 12 are fixed to the respective side frames 6, and upper links or bell-cranks 15 are attached to the brackets 12 to be freely rotatable with pivots 16. The upper link 15 has an upper long arm 22 extending upward and a lower short arm extending forward and downward. The upper link 15 is biased in a clockwise direction in FIG. 5 by the elastic force of an upper spring 13. The upper spring 13 has a first end coupled with the upper link 15 and a second end coupled with the side frame 6. The right-and-left both sides of the headrest supporter 10 are respectively coupled with the upper frames 22 and 22. The lower arms 23 are fixed to the upper portions of vertically long coupling rods 20 with pins 21.

Figure 5:
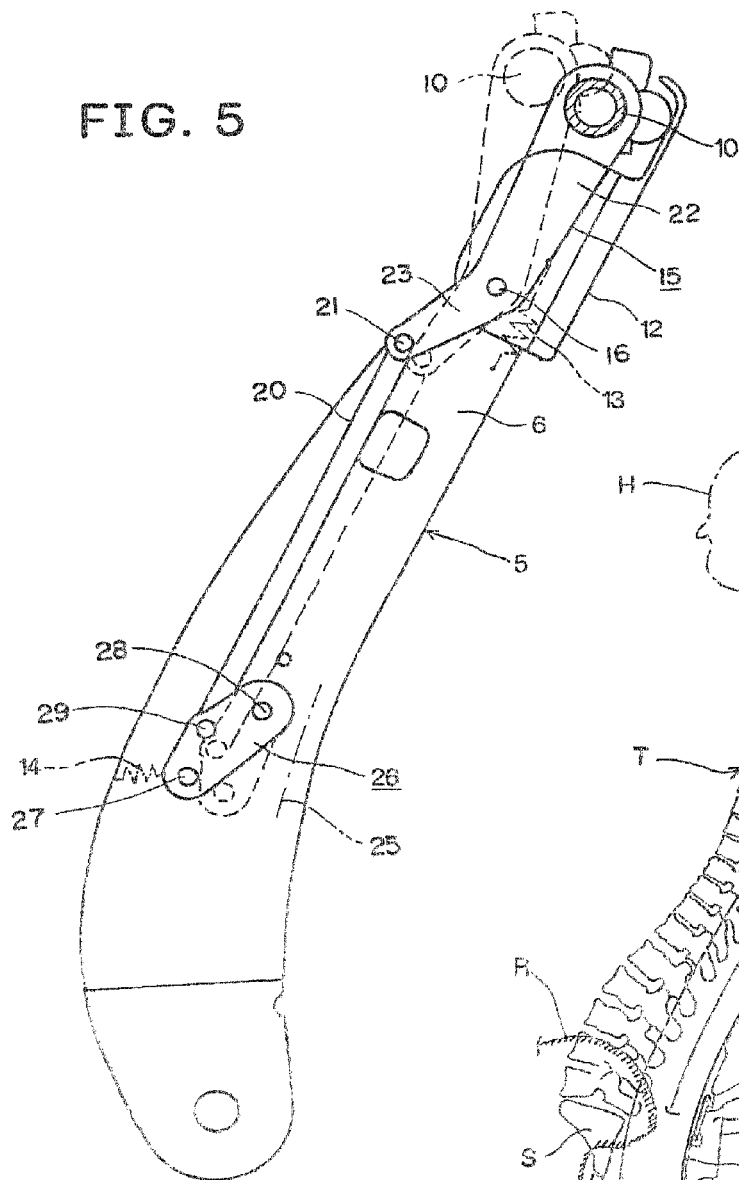
FIG. 5 is a side view of a side frame of the seat back frame and the transmission mechanism in the seat back frame.

The upper link 15 is held at a position shown by the solid line in FIG. 5 by the elastic force or the like of the upper spring 13, and thereby the headrest 4 as well is held at the normal support position. However, when the upper link 15 is rotated in a counterclockwise direction toward the position shown by the dotted line, the headrest supporter 10 is moved forward, and the headrest 4 is pushed out toward the head protection position.

A flexible cushion plate 31 is installed inside the seat back frame 5. The cushion plate 31 is preferably formed of synthetic resin such as polypropylene, forming a substantially single square plate shape. The cushion plate 31 is attached to seat springs 32 such as zigzag springs or formed wire springs. The seat springs 32 include at least an upper seat spring 32A and a lower seat spring 32B. The respective springs 32 extend substantially transversely, and the both ends thereof are coupled with the side frames 6 and 6 of the seat back frame 5. A cushion 17 of the seat back 2 is positioned anterior to the cushion plate 31 and supported elastically by the cushion plate 31.

When the cushion plate 31 receives a normal load from a seat occupant T through the cushion 17, the cushion plate 31 is moved backward within a predetermined range against the elastic force of the springs 32 while being elastically deformed moderately, to flexibly support the seat occupant T. Because the cushion plate 31 supports the cushion 17 "in a plane", a load of the seat occupant T is dispersed, which brings about more satisfactory stability and comfort to the seat occupant T as compared with a conventional structure in which the cushion 17 is supported only by the seat springs 32.

The cushion plate 31 has an upper wide section 30A, a lower wide section 30B, and a central narrow section 30C between the upper wide section 30A and the lower wide section 30B.

Figure 6:
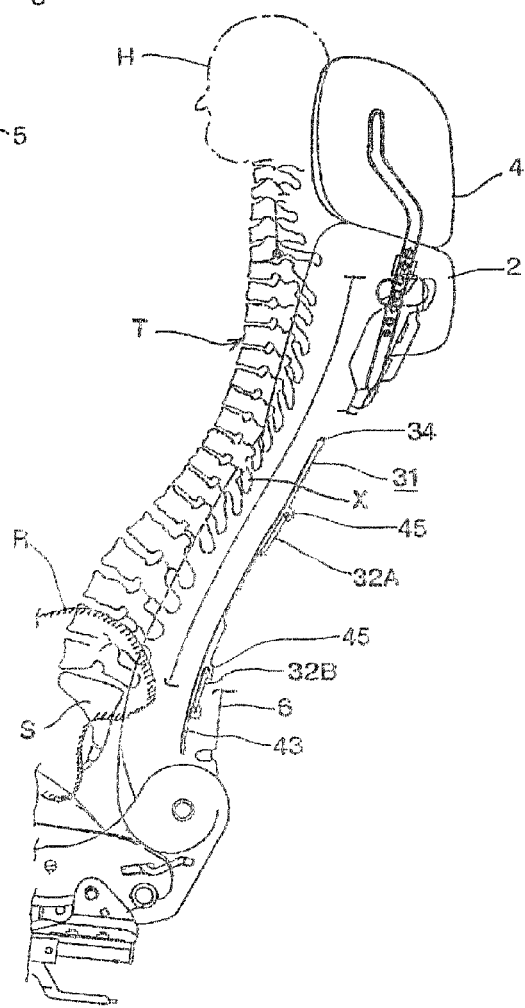
FIG. 6 is a side view show a relationship between a skeleton of a seat occupant and the cushion plate.
Figure 7:
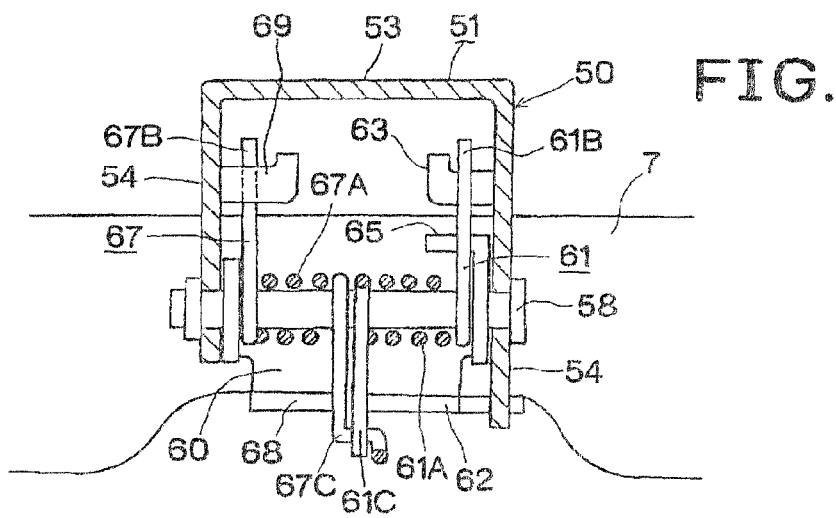
FIG. 7 is a sectional view of a lock mechanism taken along the line 7-7 in FIG. 2.
Figure 8:
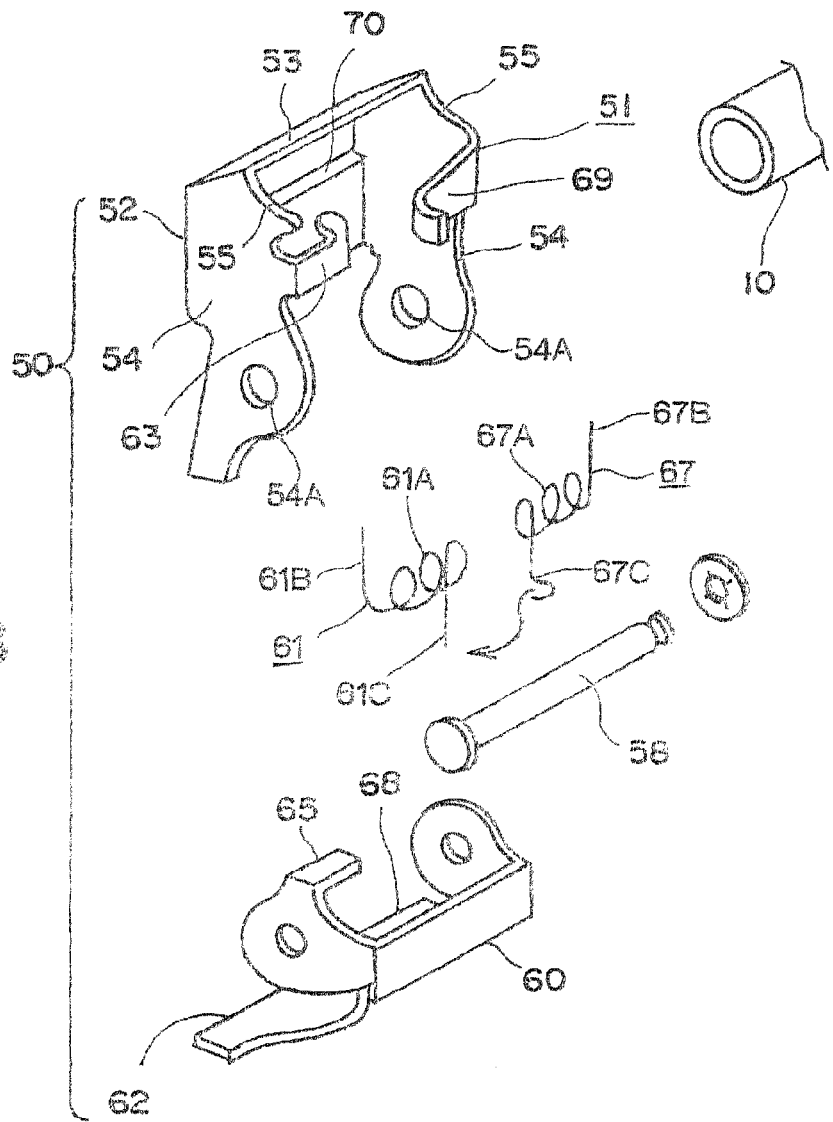
FIG. 8 is an exploded view of the lock mechanism.

The upper wide section 30A has a gentle circular upper edge 34 whose central portion is concave downward. The upper edge 34 is, as shown in FIG. 6, positioned slightly above a ninth thoracic vertebra X of the seat occupant T with an average height. The center of gravity of the upper body of the seat occupant T is positioned in the vicinity of the ninth thoracic vertebra X. In a sitting posture, a portion in the vicinity of the ninth thoracic vertebra X has the least moving distance in the upper body. Provided that the upper edge 34 is positioned above the ninth thoracic vertebra X, the cushion plate 31 is capable of coping with the movements of many portions in the upper body, which makes it possible to efficiently support the upper body.

The upper seat spring 32A is positioned at a height which is substantially the same as that of the ninth thoracic vertebra X. In FIG. 6, the upper seat spring 32A is positioned slightly below the ninth thoracic vertebra X. However, this is because a load, of the upper body onto the seat back cushion 17 is usually applied backward and downward. Accordingly, from the standpoint of the function as a spring, the seat spring 32A is on substantially the same level as the ninth thoracic vertebra X.

The lower wide section 30B has laterally protruding parts 41 and 41 to support an adjacent portion of an iliac bone R forming the upper portion of a pelvis, and a tapered downward protruding part 43 to support an adjacent portion of a sacred bone S of the pelvis. The protruding parts 41 and 43 improve the performance for holding an adjacent portion of a hip of the seat occupant T. The downward protruding part 43 is positioned between the right and left thigh muscles of the seat occupant T, and does not apply pressure onto the thigh muscles.

The central narrow section 30C includes inward concave parts 37 and 37. The inward concave parts 37 and 37 deteriorate the performance for holding an adjacent portion of a waist of the seat occupant T. When the adjacent portion of the hip of the seat occupant T is sufficiently well held by the lower section 30B, the need to hold the adjacent portion of the waist of the seat occupant T is less. If the waist is strongly held, rapid fatigue and lumbago in the seat occupant T are brought about. Further, there are great differences between individuals in a size of the waist of the seat occupant T. From this standpoint, the narrow section 30C is preferably formed between the upper section 30A and the lower section 30B.

The lower seat spring 323 is positioned in the vicinity of the boundary between the lower section 30B and the central section 30C. In this manner, the lower seat spring 32B is capable of effectively supporting a load of the hip portion of the seat occupant T.

Figure 4:
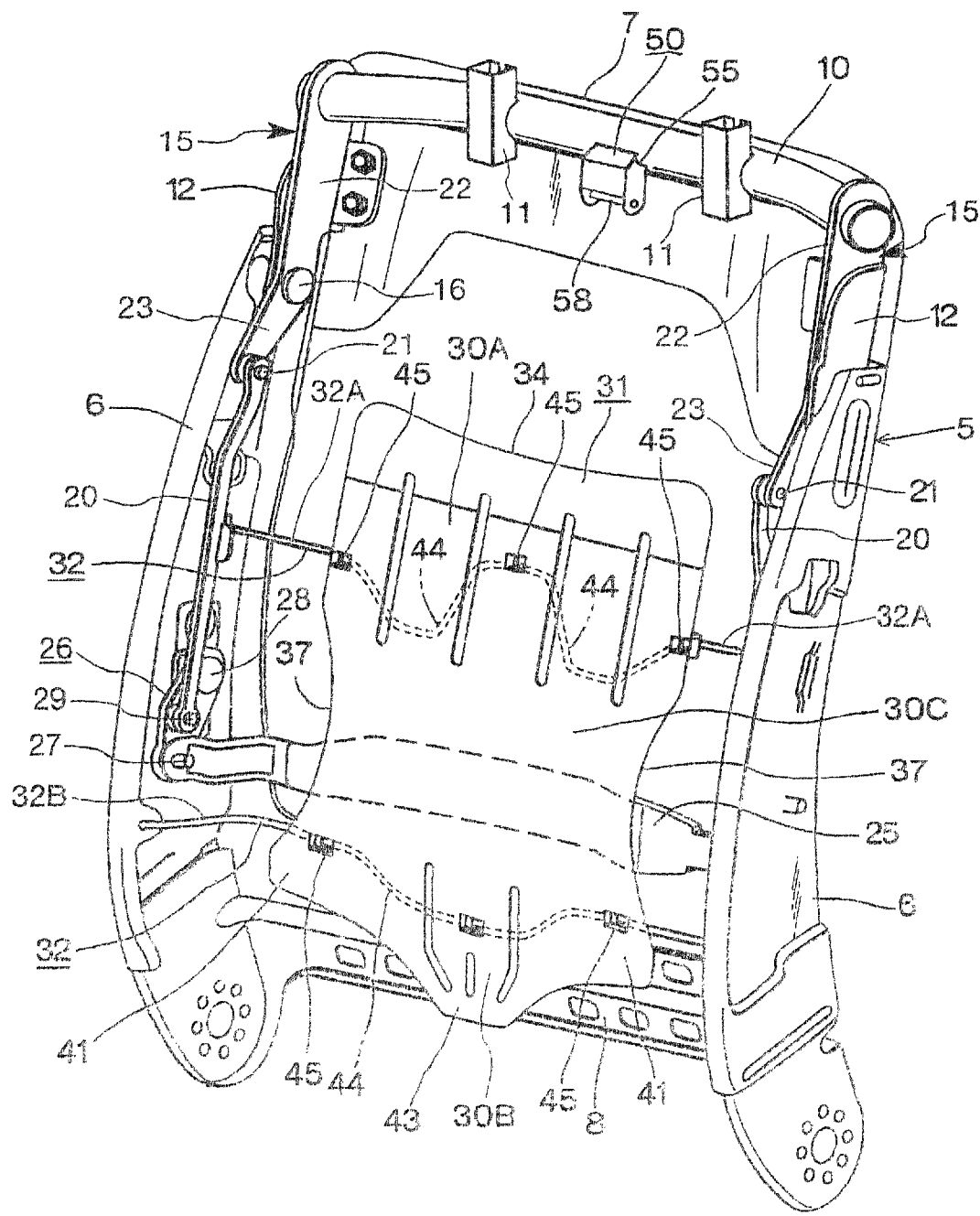
FIG. 4 is a perspective view showing a state in which a cushion plate is attached to the component in FIG. 3.

The both sides of the seat springs 32 are formed in simple linear forms. However, central zigzag parts 44 of the seat springs 32 are, as is clear from FIG. 4, curved on a plane parallel to the cushion plate 31. The zigzag parts 44 support the cushion plate 31 "in a plane", which brings about stable backward movement of the cushion plate 31. The zigzag parts 44 are engaged with a plurality of hooks 45 of the cushion plate 31 to prevent the displacement of the cushion plate 31 and the seat spring 32.

A collision sensor 25 extending transversely is installed between the side frames 6 and 6. The collision sensor 25 is disposed to be close behind the cushion plate 31. The both sides of the sensor 25 are coupled with the lower links 26 and 26, which are fixed to the side frames 6 and 6 with pivots 26 and 25, with pins 27 and 27, respectively. The lower portions of the coupling rods 20 are coupled with the lower links 26 with pins 29. As shown in FIG. 5, one ends of lower springs 14 are coupled with the lower links 26, the other ends thereof are coupled with the side frames 6, and the lower links 26 are biased in a clockwise direction. In this manner, the collision sensor 25 is held at an anterior normal position.

When the vehicle seat 1 is moved relatively forward to the seat occupant T by a rear-end collision, a collision load exceeding the normal load is applied to the cushion plate 31, and thereby the cushion plate 31 moves backward over the predetermined range, and touches the collision sensor 25 to move the sensor 25 backward. The backward movement of the sensor 25 makes the lower links 26 rotate in a counterclockwise direction in FIG. 5, to move the coupling rods 20 downward. At this time, because a distance between the pin 29 and the pivot 28 is shorter than a distance between the pin 27 and the pivot 28, the backward movement of the collision sensor 25 is efficiently transmitted to the coupling rods 20. The downward movement of the rods 20 makes the upper links 15 rotate in a counterclockwise direction, and thereby the headrest supporter 10 is moved forward. At this time, because the upper arms 22 are longer than the lower arms 23 in the upper links 15, the headrest supporter 10 is efficiently moved forward by the downward movement of the coupling rods 20. The headrest 4 is pushed out forward by the forward movement of the supporter 10, which protects a head H (cervical part) of the seat occupant T at the time of rear-end collision.

In this way, the backward movement of the collision sensor 25 by a rear-end collision is transmitted to the headrest supporter 10 via the transmission mechanism L having the upper links 15, the coupling rods 20, and the lower links 26.

The side frames 6 are formed of metal plates having a predetermined anteroposterior width, and the transmission mechanism L for transmitting the backward movement of the collision sensor 25 to the headrest supporter 10 is disposed at positions near the side frames 6. Therefore, the cushion 17 of the seat back 2 does not interfere with the movement of the transmission mechanism L.

A backward moving distance of the cushion plate 31 at the time of rear-end collision is increased in the central narrow section 30C to support a portion near the waist, and the lower section 30B to support a portion near the hip. Therefore, the collision sensor 25 is preferably positioned behind the central narrow section 30C and the lower section 30B so as to reliably receive the backward movement of the cushion plate 31. Further, because an anteroposterior width of the seat back 2 is made narrower as it goes upward, it is not preferable to dispose the collision sensor 25 behind the upper portion side of the cushion plate 31.

A lock mechanism 50, which retains the headrest 4 moved to the anterior protection position by a rear-end collision at the anterior protection position, is provided at the center of the upper frame 7. The lock mechanism 50 includes a bracket 60 fixed to the upper frame 7 and a locking member 51 attached to the bracket 60 to be freely rotatable with a horizontal shaft 58.

The locking member 51 includes a substantially vertical front plate 52 and side plates 54 and 54 curved backward from the both sides of the front plate 52, and the side plates 54 and 54 have holes 54A and 54A into which the horizontal shaft 58 is inserted. The upper part of the locking member 51 with the holes 54A (horizontal shaft 58) being as the boundary is much heavier than the lower part of the locking member 51. Therefore, in FIGS. 9 to 11, when a forward external force F is applied to the seat 1 by a rear-end collision, an inertia force in a clockwise direction is generated onto the locking member 51. The front plate 52 has a turndown part 70 in order to increase a weight of the upper part of the locking member 51 to increase an inertia force generated by a rear-end collision. An anterior inclined plane 53 and posterior inclined planes 55 inclined in a direction opposite to the anterior inclined plane 53 are provided at the top part of the locking member 51. The posterior inclined planes 55 are preferably formed to be circular arc planes corresponding to the contour of the headrest supporter 10 which is a cylindrical frame.

The locking member 51 is biased in two directions by two springs 61 and 67. A touching spring 61 includes a coil part 61A disposed on the periphery of the horizontal shaft 58, an upper leg 61B touching a curved part 63 of the locking member 51, and a lower leg 61C touching a touching part 62 of the bracket 60, and biases the locking member 51 to a clockwise direction. When the locking member 51 reaches an initial position shown in FIG. 10, the upper leg 610 of the spring 61 touches a stopper 65 of the bracket 60. Therefore, only by the elastic force of the spring 61, it is impossible to make the locking member 51 rotate from the initial position to a lock position shown in FIG. 11. In order to displace the locking member 51 to the look position, as will be described later, an inertia force in a clockwise direction generated by a rear-end collision is required.

The return spring 67 includes a coil part 67A disposed on the periphery of the horizontal shaft 56, an upper leg 67B touching a curved part 69 of the locking member 51, and a lower leg 67C engaged with an engagement part 66 of the bracket 60, and biases the locking member 51 to a counterclockwise direction. The elastic force of the return spring 67 is much weaker than the elastic force of the touching spring 61. Note that the lower leg 67C may be engaged with the lower leg 61C of the touching spring 61 in place of being engaged with the bracket 60.

In a state in which only the elastic forces of the springs 61 and 67 are applied to the locking member 51, the locking member 51 is held at the initial, position shown in FIG. 10. In this state, when the headrest supporter 10 is moved backward and downward along a move trace h, the supporter 10 touches the posterior inclined planes 55 of the locking member 51 to move the locking member 51 to a withdrawal position shown in FIG. 9, and the headrest 4 attached to the supporter 10 is displaced to the support position. The state shown in FIG. 9 is a normal state, and the locking member 51 is attached firmly to the supporter 10 by the elastic force of the touching spring 61, thereby preventing a backlash between the supporter 10 and the locking member 51.

When an external force F is applied to the seat 1 by a rear-end collision in the state shown in FIG. 9, the seat occupant T is moved relatively backward to the seat 1, which makes the collision sensor 25 move backward via the cushion plate 31. The backward movement of the sensor 25 is transmitted to the headrest supporter 10 via the transmission mechanism L, which makes the headrest supporter 10 move forward and upward along the move trace K, and makes the headrest 4 move from the support position to the head protection position. At the same time, the external force F is applied to the lock mechanism 50 as well, and an inertia force in a clockwise direction is generated onto the locking member 51 of the lock mechanism 50. Therefore, when the headrest supporter 10 is moved forward and upward, the locking member 51 is rotated in a clockwise direction by the elastic force of the touching spring 61 and the inertia force to reach the initial position in FIG. 10.

When the locking member 51 reaches the initial position in FIG. 10 from the withdrawal position in FIG. 9, the upper leg 61B of the touching spring 61 touches the stopper 65 of the bracket 60, which makes it impossible for the locking member 51 to receive assistance by the touching spring 61 for being rotated in a clockwise direction. However, the locking member 51 is continuously rotated in a clockwise direction by the inertia force generated by a rear-end collision against a weak elastic force of the return spring 67, to be displaced to the lock position in FIG. 11. During this time, because the lock mechanism 50 does not impose unnecessary resistance onto the transmission mechanism L and the headrest supporter 10, the movement of the headrest 4 to the head protection position is smoothly carried out.

When the locking member 51 is displaced to the lock position in FIG. 11, the anterior inclined plane 53 of the locking member 51 is positioned on the move trace K of the supporter 10, and the backward and downward movement of the headrest supporter 10 is regulated. Accordingly, the headrest 4 is retained at the head protection position, which makes it possible to reliably protect the head H (cervical part) of the seat occupant T at the time of rear-end collision.

In order to cancel the locked state in FIG. 11, the headrest 4 must be moved forward and upward manually. Then, the headrest supporter 10 is separated from the anterior inclined plane 53 of the locking member 51, and the locking member 51 is returned to the initial position in FIG. 10 by the elastic force of the return spring 67. Thereafter, when the headrest 4 is returned to the normal support position, the supporter 10 touches the posterior inclined planes 55 of the locking member 51, which makes the locking member 51 move to the withdrawal position shown in FIG. 9.

As described above, the touching spring 61 assists the clockwise rotation of the locking member 51 at the time of rear-end collision. However, the locking member 11 is capable of rotating up to the lock position by an inertia force even without assistance by the touching spring 61. Accordingly, the touching spring 61 is made redundant in order to achieve the essential function of the lock mechanism 50. However, if the touching spring 61 is omitted, the locking member 51 at the withdrawal position jounces, which easily generates noises between the locking member 51 and the headrest supporter 10. Accordingly, it is not desirable to omit the touching spring 61 for making the locking member 51 at the withdrawal position attached firmly to the supporter 10. Further, because the locking member 51 can be rapidly displaced to the lock position by receiving assistance from the touching spring 61, in this respect as well, it is not desirable to omit the touching spring 61.

In some cases, the headrest supporter 10 may be moved forward and upward along the move trace K even when an external force F is not applied to the seat 1 by a rear-end collision. For example, when a driver sits down on the seat 1 swiftly, the sensor 25 is moved backward, and the supporter 10 is moved forward. Further, when a person lies on the seat back 2 in a horizontal state, the sensor 25 is relatively easily moved downward, which makes the supporter 10 move forward. In this way, even when the supporter 10 is moved forward for reasons other than a rear-end collision, the locking member 51 is rotated merely to the initial position in FIG. 10. Therefore, the headrest 4 is prevented from being locked at the protection position. Namely, in order for the locking member 51 to move to the lock position, a strong inertia force in a clockwise direction generated by a rear-end collision is required. Therefore, the headrest 4 is effectively prevented from being unintentionally locked at the protection position.

The invention claimed is:

1. A vehicle seat comprising:
a seat back frame;
a collision sensor provided to the seat back frame, and said collision sensor being movable backward when a seat occupant of the vehicle seat is moved relatively backward to the seat back frame by a rear-end collision;
a headrest attached to the seat back frame and being movable between a normal support position and a head protection position anterior to the normal support position, and said headrest being movable from the normal support position to the head protection position when the collision sensor is moved backward; and
a lock mechanism attached to the seat back frame, said lock mechanism including a locking member that is moved to a lock position by inertia when receiving an external force by the rear-end collision to regulate a return of the headrest from the head protection position to the normal support position;
wherein the lock mechanism has a return spring to make the locking member disengage from the lock position, and the locking member is configured to move to the lock position by inertia against an elastic force of the return spring at the time of rear-end collision, and
wherein the lock mechanism has a touching spring to bias the locking member in a direction opposite to the return spring, the touching spring having an elastic force stronger than that of the return spring, and the locking member is held at a withdrawal position by touching the headrest when the headrest is at the normal support position, and the touching spring makes the locking member at the withdrawal position touch the headrest elastically.

2. The vehicle seat according to claim 1, further comprising:
a plurality of seat springs attached to the seat back frame;
a solid plate flexible cushion plate attached to the seat springs; and
a seat back cushion provided anterior to the cushion plate to be elastically supported by the cushion plate,
wherein the collision sensor is disposed behind the cushion plate.

3. The vehicle seat according to claim 1, wherein the touching spring is configured to bias the locking member from the withdrawal position to an initial position set between the lock position and the withdrawal position, and the locking member at the initial position is returned to the withdrawal position by touching the headrest when the headrest is moved from the head protection position to the normal support position.

4. The vehicle seat according to claim 3, further comprising:
a plurality of seat springs attached to the seat back frame;
a solid plate flexible cushion plate attached to the seat springs; and
a seat back cushion provided anterior to the cushion plate to be elastically supported by the cushion plate,
wherein the collision sensor is disposed behind the cushion plate.

5. A vehicle seat comprising:
a seat back frame;
a collision sensor provided to the seat back frame, and said collision sensor being movable backward when a seat occupant of the vehicle seat is moved relatively backward to the seat back frame by a rear-end collision;
a headrest attached to the seat back frame and being movable between a normal support position and a head protection position anterior to the normal support position, and said headrest being movable from the normal support position to the head protection position when the collision sensor is moved backward; and
a lock mechanism attached to the seat back frame, said lock mechanism including a locking member that is moved to a lock position by inertia when receiving an external force by the rear-end collision to regulate a return of the headrest from the head protection position to the normal support position, and
a plurality of seat springs attached to the seat back frame;
a solid plate flexible cushion plate attached to the seat springs; and
a seat back cushion provided anterior to the cushion plate to be elastically supported by the cushion plate,
wherein the collision sensor is disposed behind the cushion plate.

6. A vehicle seat comprising:
a seat back frame;
a collision sensor provided to the seat back frame, and said collision sensor being movable backward when a seat occupant of the vehicle seat is moved relatively backward to the seat back frame by a rear-end collision;
a headrest attached to the seat back frame and being movable between a normal support position and a head protection position anterior to the normal support position, and said headrest being movable from the normal support position to the head protection position when the collision sensor is moved backward; and
a lock mechanism attached to the seat back frame, said lock mechanism including a locking member that is moved to a lock position by inertia when receiving an external force by the rear-end collision to regulate a return of the headrest from the head protection position to the normal support position, the lock mechanism having a return spring to make the locking member disengage from the lock position, and the locking member being configured to move to the lock position by inertia against an elastic force of the return spring at the time of rear-end collision, and
a plurality of seat springs attached to the seat back frame;
a solid plate flexible cushion plate attached to the seat springs; and
a seat back cushion provided anterior to the cushion plate to be elastically supported by the cushion plate,
wherein the collision sensor is disposed behind the cushion plate.

* * * * *